(12) United States Patent
Rieger et al.

(10) Patent No.: US 6,746,780 B1
(45) Date of Patent: Jun. 8, 2004

(54) BODIES OF POLYMERIC MATERIAL COMPRISING LINEAR, ISOTACTIC POLYMERS

(75) Inventors: Bernhard Rieger, Ulm (DE); Mike Orroth, Richmond (GB); Gian De Belder, Lier (BE)

(73) Assignee: The Procter & Gamble Company, Cincinnati, OH (US)

( * ) Notice: Subject to any disclaimer, the term of this patent is extended or adjusted under 35 U.S.C. 154(b) by 50 days.

(21) Appl. No.: 10/089,344

(22) PCT Filed: Oct. 2, 2000

(86) PCT No.: PCT/US00/27135

§ 371 (c)(1),
(2), (4) Date: Mar. 27, 2002

(87) PCT Pub. No.: WO01/27169

PCT Pub. Date: Apr. 19, 2001

(30) Foreign Application Priority Data

Oct. 8, 1999 (EP) .............................................. 99120172

(51) Int. Cl.⁷ .......................... B32B 27/32; C08F 10/06; C08L 23/12
(52) U.S. Cl. ....................................... 428/516; 428/500
(58) Field of Search ................................. 428/500, 516

(56) References Cited

U.S. PATENT DOCUMENTS

| | | |
|---|---|---|
| 5,672,668 A | 9/1997 | Winter et al. |
| 5,693,836 A | 12/1997 | Winter et al. |
| 6,028,152 A | 2/2000 | Winter et al. |
| 6,248,829 B1 | 6/2001 | Fischer et al. |
| 6,359,095 B1 | 3/2002 | Winter et al. |
| 6,391,425 B1 * | 5/2002 | Migliorini et al. ........... 428/172 |

FOREIGN PATENT DOCUMENTS

| | | |
|---|---|---|
| EP | 0 707 016 A1 | 4/1996 |
| WO | WO 95/10575 A1 | 4/1995 |
| WO | WO 96/20225 A2 | 7/1996 |
| WO | WO 96/26967 A1 | 9/1996 |
| WO | WO 99/20664 A2 | 4/1999 |
| WO | WO 99/48775 A1 | 9/1999 |
| WO | WO 99/52950 | 10/1999 |
| WO | WO 99/52955 A1 | 10/1999 |

OTHER PUBLICATIONS

Dietrick, et al., "Control of Stereoerror Formation with High–Activity 'Dual–Side' Zirconocene Catalysts: A Novel Strategy To Design the Properties of Thermoplastic Elastic Polypropenes", J. Am. Chem. Soc., Washington, D.C., USA, 1999, vol. 121, pp. 4348–4355.

Rieger, et al., "Novel Metallocene Catalyzed Polypropene Homo– and Brush–Copolymers: Control of New Morphologies and Beyond", Polymeric Materials Science and Engineering, Washington, D.C., USA, Mar. 21, 1999, vol. 80, pp. 51–52.

Gauthier, et al., "Elastomeric Poly(propylene): Influence of Catalyst Structure and Polymerization Conditions on Polymer Structure and Properties", Macromolecules, 1995, 28, pp. 3771–3778, The American Chemical Society.

Chien, et al., "Metallocene Catalysts for Olefin Polymerizations, XXIV, Stereoblock Propylene Polymerization Catalyzed by rac– anti–Ethylidene (1–n⁵–Tetramethylcyclopentadienyl) 1–n⁵ –Indenyl) dimethyltitanium: A Two–State Propagation", Journal of Polymer Science: Part A: Polymer Chemistry, vol. 30, 2601–2617 (1992).

Singh, B., "Elastomeric Homopolymer Polyproylene a Unique Poloyolefin Patiently Wating to Take Off", Conference Proceedings Flexpo 2001, Chemical Market Resources, Inc., pp. 385–390.

* cited by examiner

Primary Examiner—D. S. Nakarani
(74) Attorney, Agent, or Firm—Angela Marie Stone

(57) ABSTRACT

The present invention relates to articles comprising bodies of polymeric material. Specifically, the present invention relates to bodies of elastic polymeric material.

9 Claims, No Drawings

BODIES OF POLYMERIC MATERIAL COMPRISING LINEAR, ISOTACTIC POLYMERS

FIELD OF THE INVENTION

The present invention relates to articles comprising bodies of polymeric material. Specifically, the present invention relates to bodies of elastic polymeric material.

BACKGROUND

Bodies of polymeric material and in particular of olefinic polymers are well known in the art and enjoy widespread usage throughout the industry. Typical areas of application of such body of polymeric material include for example medical applications, hygienic applications, automotive parts, sporting goods, and the like.

Conventional bodies of polymeric materials can be subdivided into rigid bodies and elastic bodies. Bodies made from commonly used polyolefins such as PP, PE, PS, PIB have a number of useful properties. They are bio-compatible and food compatible, chemically stable, inert, non toxic materials. However, most of them are rigid and have poor mechanical properties including insufficient stretchability/elasticity and the like.

Several approaches have been proposed in the prior art to render such bodies of polymeric material elastic. The most commonly used approach is based on changing the chemical structure of the polymer by introducing hinged joints/moieties into the main chain of the polymer. These hinges provide more flexibility to the polymeric backbone preventing crystallization of polymer, lowering the glass transition temperature (Tg) and improving the elasticity of the resulting material. Usually, the hinge groups contain heteroatoms providing flexibility such as oxygen, nitrogen or chlorine placed into the main chain or into bulky side groups. Another approach is mastication of the polymer by blending with special plasticizing agents. Both approaches, however, require heteroatoms to be introduced into the molecule or into the bulk of the body.

The third approach proposed in the prior art to provide elastic properties to such bodies of polymeric material, which is more close to the present invention, is to exploit the formation of hetero-phases which reinforce the bulk material by forming a physical net. To do this the block-co-polymerization of two or more different monomers has been used leading to polymeric backbones comprising blocks with different Tg. This results in micro-phase separation in the bulk with formation of reinforcing crystalline domains of one co-polymer linked with each other by flexible chains of the second co-polymer.

In essence, conventional bodies of polymeric material however carry a wide variety of inherent disadvantages including but not being limited to insufficient strength/tear resistance, insufficient stretchability/elasticity, not being bio-compatible, not being food compatible, comprising heteroatoms such as chlorine and hence leading to toxic residues when burnt, and the like.

It is a further object of the present invention to provide articles which comprise bodies of polymeric material which overcome the disadvantages of the prior art bodies of polymeric material.

It is a further object of the present invention to provide a method for manufacturing bodies of polymeric material suitable for the article of the present invention.

It is a further object of the present invention to provide a method processing a body of polymeric material suitable for the article of the present invention.

SUMMARY OF THE INVENTION

The present invention provides an article comprising a first element and a second element separated from and joined to said first element, said first element being a body of polymeric material. The article of the present invention is characterized in that said body of polymeric material comprises linear isotactic polymers having a structure of one or several $C_2$ to $C_{20}$ olefins, the isotacticity of said polymers, due to a statistic distribution of stereoscopic errors in the polymer chain, being within the range of 25% to 60% of [mmmm] pentad concentration with the proviso that an arbitrary or rather regular sequence of isotactic and atactic blocks is excluded, the polymer having a mean molecular weight Mw within the range of from 100000 to 800000 g/mol and a glass temperature $T_g$ of between −50 to +30° C.

The present invention further provides a method for manufacturing a body from polymeric material comprising a step of processing said polymeric material selected from the group of to injection molding, extrusion blow molding, extrusion, casting, solution sedimentation, and combinations thereof. The method of the present invention is characterized in that said polymeric material comprises linear or branched isotactic polymers having a structure of one or several $C_2$ to $C_{20}$ olefins, the isotacticity of said polymers, due to a statistic distribution of stereoscopic errors in the polymer chain, being within the range of 25% to 60% of [mmmm] pentad concentration with the proviso that an arbitrary or rather regular sequence of isotactic and atactic blocks is excluded, the polymer having a mean molecular weight Mw within the range of from 100000 to 800000 g/mol and a glass temperature $T_g$ of between −50 to +30° C.

The present invention further provides a method for processing a body of polymeric material comprising a step selected from the group of thermoforming, laser forming, carving, and combinations thereof. The method of the present invention is characterized in that said body of polymeric material comprises a linear or branched isotactic polymers having a structure of one or several $C_2$ to $C_{20}$ olefins, the isotacticity of said polymers, due to a statistic distribution of stereoscopic errors in the polymer chain, being within the range of 25% to 60% of [mmmm] pentad concentration with the proviso that an arbitrary or rather regular sequence of isotactic and atactic blocks is excluded, the polymer having a mean molecular weight Mw within the range of from 100000 to 800000 g/mol and a glass temperature $T_g$ of between −50 to +30° C.

DETAILED DESCRIPTION OF THE INVENTION

The present invention provides an article comprising bodies of polymeric material comprising a polyolefinic homopolymer having an isotacticity of less than 60% of [mmmm] pentad concentration.

The present invention provides body materials comprising a polyolefinic homopolymer.

The term "polyolefinic homopolymer" as used herein refers to those polyolefins which comprise only one phase of molecules all of which exhibiting a similar stereochemical configuration. For example, blends of atactic and isotactic polymers where the two phases have polymerized simultaneously are excluded when this term is used. The term homopolymer includes copolymers where all molecules exhibit a similar stereochemical configuration.

The polyolefinic homopolymer of the present invention may comprise linear isotactic polymers having a structure or one or several $C_3$ to $C_{20}$ olefinic monomers, having an isotacticity of less than 60%, preferably less than 55%, more preferably less than 50%, and most preferably less than 45% of [mmmm] pentad concentration, and having an isotacticity of more than 15%, preferably more than 20%, and more preferably more than 25% of [mmmm] pentad concentration. Preferably, the polyolefinic homopolymer is polypropylene.

The isotacticity of the homopolymers may be reduced compared to the isotactic polypropylenes of the prior art due to a statistic distribution of stereoscopic errors in the polymer chain. The term "stereoscopic error" refers to a stereoscopic sequence characterized by a [mrrm] pentad. In this case, the central monomer has a stereo configuration opposed to the other four monomers in this pentad. The [mrrm] pentad concentration of this polymer therefore is above the statistical probability of $p^2 (1-p)^2$ where p=[m] and hence 1−p=[r] and $p^4$=[mmmm]. Preferably, the pentad concentration is at least $[p (1-p)]^q$ p (1−p) with q being 0.8, more preferably q being 0.6, yet more preferably q being 0.4, yet more preferably q being 0.2, most preferably q being 0.1.

In some embodiments of the homopolymer and in particular in those embodiments where the crystallinity is reduced by means of single stereo errors, a low content of atactic sequences has proven beneficial to the properties of the body of the present invention. Preferably, the [rmrm] pentad concentration is below 6%, more preferably below 5%, yet more preferably below 4%, yet more preferably below 3%, most preferably below 2.5%.

In some embodiments of the homopolymer and in particular in those embodiments where the crystallinity is reduced by means of single stereo errors, a low content of syndiotactic sequences has proven beneficial to the properties of the body of the present invention. Preferably, the [rrrr] pentad concentration is below 6%, more preferably below 5%, yet more preferably below 4%, yet more preferably below 3%, most preferably below 2.5%.

Alternatively, the homopolymer of the present invention may include sequences of atactic and isotactic blocks of polymer.

Preferably, the mean molecular weight $M_w$ of the polymer is above 100000 g/mol, more preferably above 200000 g/mol, yet more preferably above 250000 g/mol, yet more preferably more than 300000 g/mol, most preferably more than 350000 g/mol.

The glass temperature $T_g$ is between −50 and +30° C. Preferably the glass temperature is below 10° C., more preferably below 5° C., yet more preferably below 0° C., most preferably below −6° C. The melt temperature of the polymer is obtained after heating the sample 150° C. and subsequently cooling the polymer to −50° C.

Without wishing to be bound by this theory, the polyolefinic polymers exhibit a semi-crystalline structure. The structure contains elastic amorphous areas of nano-scale-size reinforced with self arranged crystalline domains of nano-crystals. The formation of brittle macro-crystalline material from the polymer is achieved by introducing the defects into the polymeric backbone. Isolated monomer units with opposite stereo configuration have been used as the defects, i.e. single stereo errors.

Suitable polymers and a process for manufacturing such polymers are described in PCT patent application EP99/02379 incorporated herein by reference. A catalyst combination suitable for the preparation of such polymers is described in PCT patent application EP99/02378 incorporated herein by reference. Preferably, the process of PCT patent application EP99/02378 is carried out by temperatures of less than 30° C., more preferably less than 25° C., yet more preferably less than 20° C., most preferably less than 15° C. to increase the molecular weight of the resulting polymer. In order to increase the molecular weight, the polymerization is preferably carried out in liquid monomer such as in liquid propene. In order to increase the molecular weight, the catalyst is preferably used in combination with the boron activators mentioned in PCT patent application EP99/02378.

Other suitable polymers and a process for manufacturing such polymers is described in WO99/20664 incorporated herein by reference.

It is preferred to use homopolymers for the bodies of the present invention since during manufacture of homopolymers the batch to batch variability is greatly reduced in comparison to multi phase polymers where the phases are polymerized in a single reaction.

Preferably, the polymers used in manufacturing the body materials of the present invention have a distinctive rubber-elastic plateau in their tensile-strength curves.

The polymers used for the body of the present invention are bio-compatible and may be burnt without toxic residues since they contain no heteroatoms such as chlorine. They further do not contain toxic monomer residues.

The body materials of the present invention have been found to be able to exhibit superior softness. Preferably, the body material has a Shore hardness on the A scale of less than 30, more preferably, of less than 25, yet more preferably of less than 20, yet more preferably of less than 15, most preferably of less than 10. The softness of the body material of the present invention can be increased by manufacturing the body by low density bodying and by reducing the isotacticity ([mmmm] pentad concentration).

The body material has been found to exhibit increased temperature stability compared to prior art body materials. This is partly due to the fact that for the bodies of the present invention a homopolymer is used and is partly due to the high molecular weight of the homopolymer. Preferably, the body material of the present invention has a melting point of at least 100° C., more preferably of at least 110° C., more preferably of at least 120° C., most preferably of at least 130° C. The melt temperature of the polymer is obtained after heating the sample 150° C. and subsequently cooling the polymer to −50° C. Higher melting point may be achieved my blending the homopolymer for example with conventional isotactic polymer such as polypropylene.

The body of the present invention has been found to be stretchable as well as elastic. The stretchability of the body versus its elastic behavior can be adjusted by means of the tacticity of the homopolymer of the present invention. The body material of the present invention has been found to be stretchable without tearing to at least 500% of its original length, more preferably 1000% of its original length, yet more preferably to at least 1500% of its original length, most preferably to at least 2000% of its original length. In addition, the body material of the present invention preferably recovers within 10 minutes after being stretched and held for 1 minute to 500% of its original length back to less than 300% of its original length, preferably less than 200% of its original length, most preferably less than 150% of its original length. In addition, the body of the present invention has been found to exhibit a low compressive set. The body of the present invention recovers within 10 minutes after a compression to 50% of its original thickness for 1 minute to at least 60% of its original thickness, more preferably at least 70% of its original thickness, yet more preferably to at least 80% of its original thickness, yet more preferably to at least 90% of its original thickness, most preferably to at least 95% of its original thickness. The compressibility of the body of the present invention can be adjusted by increasing the tacticity of the homopolymer or by blending the low tacticity homopolymer with conventional isotactic polymer such as polypropylene.

The body of the present invention has been found to exhibit a relative low tackiness at room temperature due to the high molecular weight of the polymer.

Various additives may be added to the homopolymer of the present invention to change the properties of the polymer such as is well known in the art.

There are known in the art a wide variety of suitable methods to manufacture and/or to further process bodies from the polymer of the present invention including but not being limited to injection molding, extrusion blow molding, extrusion, casting, solution sedimentation, thermoforming, laser forming, carving, combination thereof, and the like. For at least some of the manufacturing techniques and in particular for the molding processes, it may useful to add to the homopolymer having a low isotacticity a homopolymer having a high isotacticity such as those conventionally known isotactic polypropylenes. Preferably, the isotactic homopolymer is added at a level of at least 20% of the total weight of the polymeric body, more preferably at a level of at least 40%, yet more preferably at a level of at least 50%, most preferably at a level of at least 60%. Preferably, the low isotacticity homopolymer of the present invention is present in the polymeric body of the present invention at a level of at least 20%, more preferably at least 30%, yet more preferably at least 40%, most preferably at least 50% by total weight of the polymeric body. Preferably, the shrinkage of the molded is less than 10%, more preferably less than 8%, yet more preferably less than 6%, most preferably less than 4%. Compared to processing substantially pure polypropylene, the blending with the homopolymer of the present invention when making the body of the present invention allows processes such as extrusion to be performed at higher speeds since the required forces, pressure, or torques respectively are lowered.

The second element of the article of the present invention can preferably be made from the same homopolymer as the first element, either having the same low isotacticity or a different isotacticity depending on the intended use of the second element. The configuration of the polymeric material of the second element can also be a body or it could be a foam, a fiber, a film, or the like. Making articles from different grades of the same material is beneficial when recycling material from a disposed article. If the same homopolymer is used for the different elements of the article, no separation step into the various materials is necessary before recycling of the material.

It may be useful to blend additives into the homopolymer of the present invention. A broad variety of such additives is known in the art and can be used accordingly. For example, small amounts of a thermal stabilizer, such as 0.1%–0.25% of a phenol/phosphite blend, can be mixed into the homopolymer of the present invention to increase the thermal stability of the polymer during processing.

The article according to the present invention may be a hygienic article. The term "hygienic article" as used herein refers to articles which are intended to be used in contact with or in proximity to the body of a living being. Such hygienic articles may be disposable or intended for multiple or prolonged use. Such hygienic articles include but are not limited to catheters, tubing, drainage systems, syringes, grafts, prosthetics, body implants, instrumentation, support means, toothbrushes, bed covers, stents, gaskets, pump diaphragms, baby bottle nipples, pacifiers, and the like. Having regard to the specific advantages of the polymers used for the articles of the present invention, it will be readily apparent to the skilled practitioner to apply the bodies of polymeric material according to the present invention in the above and similar hygienic articles.

The article according to the present invention may be a household article. The term "household article" as used herein refers to articles intended to be used when running a household. The household articles of the present invention include but are not limited to garbage bins, storage containers, hoses, toys, kitchenware, clothing, shoes, furniture in particular garden furniture, sporting goods, bellows, and the like. Having regard to the specific advantages of the polymers used for the articles of the present invention, it will be readily apparent to the skilled practitioner to apply the bodies of polymeric material according to the present invention in the above and similar household articles.

The article according to the present invention may further be an automotive part including but not being limited to bumper fascia, air dams, side moldings, fender flares, grills, body panels, ducts, tires, vibration dampers, flexible joints, window seals, interior parts, door gaskets, automotive boots, and the like. Having regard to the specific advantages of the polymers used for the articles of the present invention, it will be readily apparent to the skilled practitioner to apply and to optionally modify the bodies of polymeric material according to the present invention in the above and similar automotive parts.

The body of polymeric material according to the present invention may also be used as a construction element in an article. Thereby, the functionalities of the body of polymeric material include, but are not limited to supporting, carrying, fixing, protecting other elements of the article and the like. Such articles include but are not limited to cover parts, complex constructions such as buildings (weather stripping, expansion joints, door gaskets and seals, water gaskets, window seals, hoses, ducts, tubes, wire and cable insulation, floor coverings, and the like), cars, household appliances, horticultural and agricultural constructions, and the like. Having regard to the specific advantages of the polymers used for the articles of the present invention, it will be readily apparent to the skilled practitioner to apply and to optionally modify the bodies of polymeric material according to the present invention as construction elements in the above and similar articles.

What is claimed is:

1. An article comprising a first element and a second element separated from and joined to said first element, said first element being a body of polymeric material characterized in that said body of polymeric material comprises a polyolefinic homopolymer having one phase of molecules all of which exhibit a similar stereochemical configuration and having an isotacticity of less than 60% of [mmmm] pentad concentration, a [rmrm] pentad concentration below 3%, and a [rr] pentad concentration below 6%.

2. An article according to claim 1 wherein said body of polymeric material further comprises a polyolefinic homopolymer having an isotacticity of more than 70% of [mmmm] pentad concentration.

3. An article according to claim 1 wherein said homopolymer is polypropylene.

4. An article according to claim 1 wherein said article is a hygienic article.

5. An article according to claim 1 wherein said article is a construction element of the article.

6. An article according to claim 1 wherein said article is an automotive part.

7. An article according to claim 1 wherein said article is a household article.

8. A method for manufacturing a body from polymeric material comprising a step of processing said polymeric material selected from the group of injection molding, extrusion blow molding, extrusion, casting, solution sedimentation, and combinations thereof characterized in that said polymeric material comprises a polyolefinic homopolymer having one phase of molecules all of which exhibit a similar stereochemical configuration and having an isotacticity of less than 60% of [mmmm] pentad concentration, a [rmrm] pentad concentration below 3%, and a [rr] pentad concentration below 6%.

9. A method for processing a body of polymeric material comprising a step selected from the group of thermoforming, laser forming, carving, and combinations thereof characterized in that said body of polymeric material comprises a polyolefinic homopolymer having one phase of molecules all of which exhibit a similar stereochemical configuration and having an isotacticity of less than 60% of [mmmm] pentad concentration, a [rmrm] pentad concentration below 3%, and a [rr] pentad concentration below 6%.

* * * * *